United States Patent
Srinivasan

(10) Patent No.: US 10,013,287 B2
(45) Date of Patent: *Jul. 3, 2018

(54) SYSTEM AND METHOD FOR STRUCTURING SELF-PROVISIONING WORKLOADS DEPLOYED IN VIRTUALIZED DATA CENTERS

(71) Applicant: Micro Focus Software Inc., Provo, UT (US)

(72) Inventor: K. Y. Srinivasan, Princeton Junction, NJ (US)

(73) Assignee: Micro Focus Software Inc., Provo, UT (US)

( * ) Notice: Subject to any disclaimer, the term of this patent is extended or adjusted under 35 U.S.C. 154(b) by 485 days.

This patent is subject to a terminal disclaimer.

(21) Appl. No.: 13/690,126

(22) Filed: Nov. 30, 2012

(65) Prior Publication Data

US 2013/0091508 A1 Apr. 11, 2013

Related U.S. Application Data

(63) Continuation of application No. 12/862,266, filed on Aug. 24, 2010, now Pat. No. 8,327,373.

(51) Int. Cl.
*G06F 9/46* (2006.01)
*G06F 9/50* (2006.01)

(52) U.S. Cl.
CPC .......... *G06F 9/5005* (2013.01); *G06F 9/5077* (2013.01); *G06F 2209/508* (2013.01)

(58) Field of Classification Search
None
See application file for complete search history.

(56) References Cited

U.S. PATENT DOCUMENTS

| | | |
|---|---|---|
| 6,880,002 B2 | 4/2005 | Hirschfeld et al. |
| 7,225,441 B2 | 5/2007 | Kozuch et al. |
| 7,284,054 B2 | 10/2007 | Radhakrishnan |

(Continued)

OTHER PUBLICATIONS

Steinder, Malgorzata, et al., "Server Virtualization in Autonomic Management of Heterogeneous Workloads", IEEE, (2007), 139-148.

*Primary Examiner* — Wissam Rashid
(74) *Attorney, Agent, or Firm* — Schwegman, Lundberg Woessner, P.A.

(57) ABSTRACT

The system and method for structuring self-provisioning workloads deployed in virtualized data centers described herein may provide a scalable architecture that can inject intelligence and embed policies into managed workloads to provision and tune resources allocated to the managed workloads, thereby enhancing workload portability across various cloud and virtualized data centers. In particular, the self-provisioning workloads may have a packaged software stack that includes resource utilization instrumentation to collect utilization metrics from physical resources that a virtualization host allocates to the workload, a resource management policy engine to communicate with the virtualization host to effect tuning the physical resources allocated to the workload, and a mapping that the resource management policy engine references to request tuning the physical resources allocated to the workload from a management domain associated with the virtualization host.

20 Claims, 4 Drawing Sheets

(56) References Cited

U.S. PATENT DOCUMENTS

| | | |
|---|---|---|
| 7,284,244 B1 | 10/2007 | Sankaranarayan et al. |
| 7,296,133 B2 | 11/2007 | Swanberg |
| 7,596,620 B1 | 9/2009 | Colton et al. |
| 7,757,216 B2 | 7/2010 | Maron |
| 7,962,647 B2 | 6/2011 | Suri et al. |
| 8,161,475 B2 | 4/2012 | Araujo, Jr. et al. |
| 8,239,509 B2 | 8/2012 | Ferris et al. |
| 8,327,373 B2 | 12/2012 | Srinivasan |
| 2002/0087393 A1 | 7/2002 | Philonenko |
| 2004/0143664 A1 | 7/2004 | Usa et al. |
| 2005/0005018 A1 | 1/2005 | Datta |
| 2005/0132335 A1 | 6/2005 | Maron |
| 2007/0294676 A1* | 12/2007 | Mellor et al. ................. 717/139 |
| 2008/0080552 A1 | 4/2008 | Gates et al. |
| 2008/0082977 A1 | 4/2008 | Araujo et al. |
| 2009/0241109 A1* | 9/2009 | Vandegrift et al. ............... 718/1 |
| 2009/0276771 A1 | 11/2009 | Nickolov et al. |
| 2009/0293056 A1* | 11/2009 | Ferris ................................ 718/1 |
| 2009/0328030 A1* | 12/2009 | Fries ............................ 717/174 |
| 2010/0268764 A1 | 10/2010 | Wee et al. |
| 2010/0274890 A1 | 10/2010 | Patel et al. |
| 2010/0306767 A1* | 12/2010 | Dehaan ............................. 718/1 |
| 2011/0016473 A1 | 1/2011 | Srinivasan |
| 2011/0023048 A1 | 1/2011 | Srinivasan |
| 2011/0041126 A1 | 2/2011 | Levy et al. |
| 2011/0107299 A1 | 5/2011 | Dehaan |
| 2011/0125894 A1 | 5/2011 | Anderson et al. |
| 2011/0126197 A1 | 5/2011 | Larsen et al. |
| 2011/0179132 A1 | 7/2011 | Mayo et al. |
| 2011/0179162 A1 | 7/2011 | Mayo et al. |
| 2012/0054763 A1 | 3/2012 | Srinivasan |

\* cited by examiner 100,013,287 B2

SYSTEM AND METHOD FOR STRUCTURING SELF-PROVISIONING WORKLOADS DEPLOYED IN VIRTUALIZED DATA CENTERS

This application is a continuation of U.S. patent application Ser. No. 12/862,266, filed on Aug. 24, 2010, now issued as U.S. Pat. No. 8,327,373, which is incorporated herein by reference in its entirety.

FIELD OF THE INVENTION

The invention generally relates to a system and method for structuring self-provisioning workloads deployed in virtualized data centers, and in particular, to a scalable architecture that can inject intelligence and embed policies into managed workloads to provision and tune resources allocated to the managed workloads, thereby enhancing workload portability across various cloud and virtualized data centers.

BACKGROUND OF THE INVENTION

Many current efforts ongoing within the information technology community include considerable interest in the concept of "intelligent workload management." In particular, much of the recent development in the information technology community has focused on providing better techniques to intelligently mange "cloud" computing environments, which generally include dynamically scalable virtualized resources that typically provide network services. For example, cloud computing environments often use virtualization as the preferred paradigm to host workloads on underlying physical hardware resources. For various reasons, computing models built around cloud or virtualized data centers have become increasingly viable, including cloud infrastructures can permit information technology resources to be treated as utilities that can be automatically provisioned on demand. Moreover, cloud infrastructures can limit the computational and financial cost that any particular service has to the actual resources that the service consumes, while further providing users or other resource consumers with the ability to leverage technologies that could otherwise be unavailable. Thus, as cloud computing and storage environments become more pervasive, many information technology organizations will likely find that moving resources currently hosted in physical data centers to cloud and virtualized data centers can yield economies of scale, among other advantages.

Nonetheless, although many efforts in the information technology community relates to moving towards cloud and virtualized computing environments, existing systems tend to fall short in adequately addressing concerns relating to managing or controlling workloads and storage in such environments. For example, cloud infrastructures are typically designed to support generic business practices, which can prevent individuals and organizations from having the ability to suitably change or otherwise manage important aspects associated the cloud computing platforms. Moreover, concerns regarding performance, latency, reliability, and security tend to present significant challenges because outages and downtime can lead to lost business opportunities and decreased productivity, while generic cloud computing platforms may present concerns relating to governance, risk, and compliance. In other words, although the "state of the art" in instrumentation and management may be appropriate for workloads deployed in corporate data centers, the lack of visibility into cloud and virtualized data centers may result in significant management problems. As such, techniques currently used to instrument and manage workloads deployed in corporate data centers typically do not scale in cloud computing environments.

For example, FIG. 1 illustrates an exemplary existing system 100 typically used to structure workloads that have been deployed in virtualized data centers (e.g., a virtualized corporate computing infrastructure). In particular, the typical existing system 100 generally includes a data center manager (or orchestrator) 110 that has responsibility to manage one or more virtualization hosts (or management domains) 120. For example, the data center manager 110 may generally manage decisions that relate to deploying workloads 140 to the virtualization hosts and managing physical hardware and hypervisor resources 130 that have been assigned or otherwise allocated to the workloads 140. In many cases, the managed workloads 140 will have various attributes, parameters, or other constraints that relate to the physical hardware and hypervisor resources 130 that the workloads 140 require (e.g., a particular managed workload 140 may include a service level agreement that defines minimum storage capacities, memory requirements, network bandwidth, or other resource parameters). As such, the existing system 100 shown in FIG. 1 typically instruments the virtualization host 120 and the managed workload 140 to collect utilization metrics relating to the physical hardware and hypervisor resources 130 allocated to the workloads 140. The utilization metrics that the virtualization host 120 and the managed workload 140 collect would then be provided to the data center manager 110, which applies any specified policies relevant to determining whether to provision or tune the resources allocated to the workload (e.g., increasing storage capacity allocated to the workload 140 in response to the currently allocated storage capacity violating a service level agreement).

To close the resource management loop, the existing system 100 shown in FIG. 1 typically has the data center manager 110 communicate with the virtualization host 120 to effect provisioning or otherwise tuning the physical hardware and hypervisor resources 130 allocated to the managed workload 140. Accordingly, although the existing system 100 shown in FIG. 1 can provision or otherwise tune resources that have been assigned or allocated to managed workloads 140, the management infrastructure used therein suffers from several drawbacks. In particular, the management infrastructure that the existing system 100 uses to provision or otherwise tune resources allocated to managed workloads 140 lacks scalability because the data center manager 110 often becomes a bottleneck, especially in computing environments that have substantial quantities of workloads 140 or virtualization hosts 120 that need management. Moreover, in many scenarios, the management infrastructure shown in FIG. 1 may be impossible to deploy in cloud and virtualized data centers because cloud and virtualized data centers tend to provide little or no visibility into the underlying infrastructure, especially the abstracted physical hardware and hypervisor resources 130 allocated to the workloads 140 that may be deployed therein.

SUMMARY OF THE INVENTION

According to one aspect of the invention, a system and method for structuring self-provisioning workloads deployed in virtualized data centers may include a scalable architecture that can inject intelligence and embed policies into managed workloads deployed in cloud and virtualized data centers. In particular, the system and method described herein may generally be used to provision and tune resources allocated to the managed workloads in the cloud and virtualized data centers, thereby enhancing portability for the managed workloads across various cloud and virtualized data centers. In one implementation, the system and method described herein may structure the self-provisioning workloads for management in various dimensions to provide "intelligent workload management" over various attributes associated with the self-provisioning workloads. For example, to provide the "intelligent workload management" over the various attributes associated with the self-provisioning workloads, the system and method described herein may provision and tune physical resources allocated to the self-provisioning workloads in the various cloud and virtualized data centers and control governance, risk, and compliance for the self-provisioning workloads, among other things. For example, as will be described in further detail herein, the intelligence and policies that support self-provisioning within the managed workloads may include various components, including resource utilization instrumentation, a resource management policy engine, and a virtualization host specific mapping.

According to one aspect of the invention, the system and method described herein may support self-provisioning within managed workloads with resource utilization instrumentation, which may be structured within the managed workload at a lowest level. In particular, the resource utilization instrumentation may collect or gather information relating to utilization metrics associated with resources that various virtualization hosts (or management domains) have assigned or otherwise allocated to the managed workload. For example, the resource utilization instrumentation may monitor the allocated resources to gather utilization metrics relating to processing, memory, input/output bandwidth, storage, or other suitable resources that the virtualization hosts allocate to the workload. In one implementation, the resource utilization instrumentation may include a packaged module that can be loaded with a kernel associated with the managed workload, wherein the kernel may load the resource utilization instrumentation into a guest operating system that can run the workload over underlying physical hardware resources that certain virtualization hosts allocate to host the workload.

According to one aspect of the invention, the system and method described herein may further structure the managed workload with the resource management policy engine at a next level above the resource utilization instrumentation. The resource management policy engine may receive raw resource utilization metrics that the resource utilization instrumentation collects from the underlying physical resources. In one implementation, the resource management policy engine may then process the raw resource utilization metrics received from the resource utilization instrumentation to determine whether any action needs to be taken to tune or otherwise correct the physical resources allocated to the managed workload. For example, the resource management policy engine may evaluate whether the workload has any service level agreements or policies that define requirements associated with the allocated resources, whereby in response to determining that the raw resource utilization metrics violate any defined service level agreements or other policies, the resource management policy engine may initiate appropriate corrective action to remedy the violations. Alternatively, in response to determining that the raw resource utilization metrics comply with service level agreements or other policies associated with the workload, the resource management policy engine may determine that the virtualization host has allocated suitable physical resources to the workload and take no further action at that time.

According to one aspect of the invention, the system and method described herein may further structure the managed workload with the virtualization host specific mapping at a next level above the resource management policy engine. In particular, the hypervisor that a particular virtualization host allocates to the workload may generally execute the guest operating system hosting the workload over the underlying physical hardware resources, whereby the hypervisor may permit various workloads to share underlying physical hardware resources that the virtualization hosts allocate to host the workload. As such, a management domain within the virtualization host typically has responsibility to provision the physical hardware resources allocated to the guest operating system that hosts the workload, whereby the managed workload may execute the resource management policy engine in a guest virtual machine structured to communicate with the virtualization host. In particular, the resource management policy engine may be structured to communicate with the virtualization host to request that the virtualization host provision or tune the physical resources allocated to the guest operating system hosting the workload. As such, the virtualization host specific mapping may isolate the resource management policy engine from any differences between interfaces associated with the different management domains used across the various virtualization hosts. In this context, one or more virtual machine configuration files that can launch the guest operating system hosting the workload may specify limits or ranges for the physical resources to allocate to the guest operating system, wherein the resource management policy engine may reference the virtual machine configuration files to manage allocated physical resources within the limits or ranges specified in the virtual machine configuration files.

According to one aspect of the invention, in response to the physical resources allocated to the workload failing to comply with the limits or ranges specified in the virtual machine configuration files, or alternatively that the allocated physical resources have measured utilization metrics failing to comply with relevant service level agreements or other policies, the resource management policy engine may reference the virtualization host specific mapping to communicate with a particular virtualization host that can provision or tune the physical resources allocated to the workload. In one implementation, the resource management policy engine may then communicate a resource provisioning request to an interface associated with the particular virtualization host, wherein the request may specify the resource limits, ranges, or utilization metrics that the workload requires. The management domain associated with the virtualization host may then receive the resource provisioning request from the resource management policy engine and validate whether the virtualization host can satisfy the resource limits, ranges, or utilization metrics that the workload requires. In response to determining that the virtualization host has available physical hardware resources that can satisfy the request, the virtualization host may then provision the resources to the workload. Alternatively, in response to not having sufficient available physical hardware resources to satisfy the request, the resource management policy engine (or the virtualization host) may communicate with a data center manager, orchestrator, or other suitable resource manager, which may redeploy one or more aspects or portions of the workload to another virtualization with sufficient available resources to satisfy the request.

According to one aspect of the invention, the resource utilization instrumentation, the resource management policy engine, and the virtualization host specific mapping may therefore provide a structured software stack that can be packaged and injected into the managed workload. In particular, any suitable workload generating tool or utility may be modified to inject the structured software stack into the managed workload, whereby injecting the managed workload with the structured software stack having the resource utilization instrumentation, the resource management policy engine, and the virtualization host specific mapping packaged therein may support self-provisioning in the managed workload across various cloud or virtualized data centers.

Other objects and advantages of the invention will be apparent to those skilled in the art based on the following drawings and detailed description.

DETAILED DESCRIPTION

Figure 1:
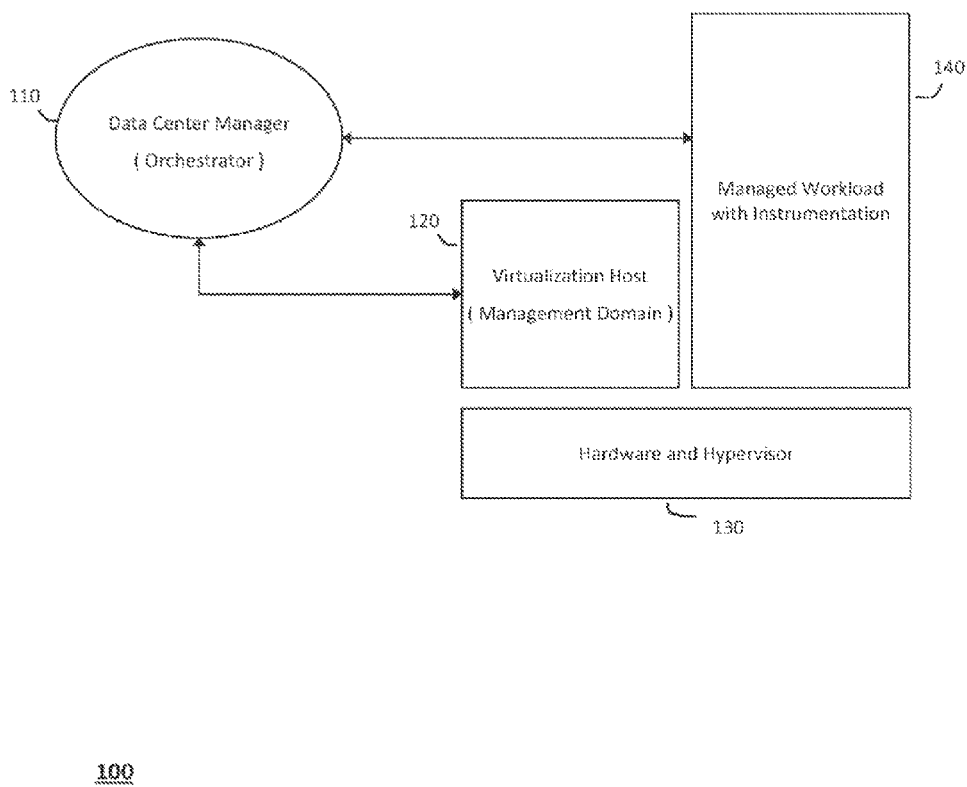
FIG. 1 illustrates an exemplary existing system typically used to structure workloads that have been deployed in virtualized data centers.
Figure 2:
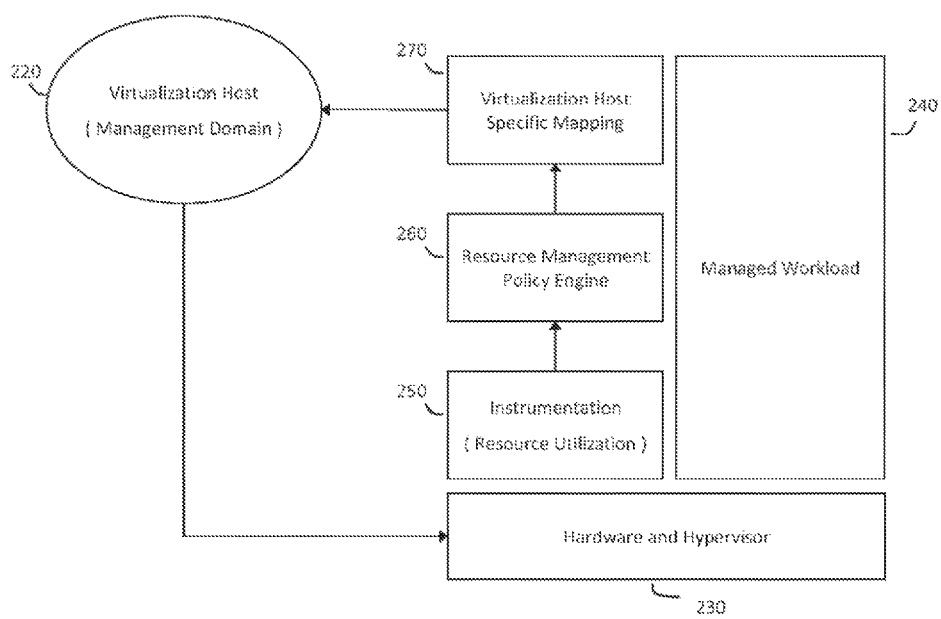
FIG. 2 illustrates an exemplary system for structuring self-provisioning workloads deployed in virtualized data centers, according to one aspect of the invention.

According to one aspect of the invention, FIG. 2 illustrates an exemplary system 200 that can be used to structure a self-provisioning workload 240 deployed in virtualized data centers. In particular, the system 200 illustrated in FIG. 2 may provide a scalable architecture that can inject intelligence and embed policies into the self-provisioning workload 240, whereby the system 200 may generally be used to provision and tune physical hardware and hypervisor resources 230 allocated to the workload 240 in the cloud and virtualized data centers. As such, the scalable architecture provided in the system 200 may enhance portability for the managed workload 240 across various cloud and virtualized data centers. In one implementation, the self-provisioning workload 240 may be structured for management in various dimensions to provide "intelligent workload management" over various attributes associated with the self-provisioning workload 240.

For example, to provide the "intelligent workload management" over the various attributes associated with the self-provisioning workload 240, the system 200 may be used to provision and tune physical resources 230 allocated to the self-provisioning workload 240 in the virtualized data centers and control governance, risk, and compliance for the self-provisioning workload 240, among other things. For example, as will be described in further detail herein, the intelligence and policies that support self-provisioning within the managed workload 240 may include various components, including resource utilization instrumentation 250, a resource management policy engine 260, and a virtualization host specific mapping 270. Furthermore, one implementation, the system 200 may include various additional components and features that can be used to provide intelligent workload management over the self-provisioning workload 240 (e.g., as described in further detail in U.S. patent application Ser. No. 12/725,241, entitled "System and Method for Intelligent Workload Management," filed on Mar. 16, 2010, now issued, as U.S. Pat. No. 8,745,205, the contents of which are hereby incorporated by reference in their entirety).

In one implementation, as noted above, the intelligence and policies that may be used to support self-provisioning within the managed workload 240 may include resource utilization instrumentation 250. In particular, the managed workload 240 may be structured with the resource utilization instrumentation 250 at a lowest level, wherein the resource utilization instrumentation 250 may collect or otherwise gather information relating to utilization metrics associated with resources that one or more virtualization hosts (or management domains) 250 have assigned or otherwise allocated to the managed workload 240. For example, the resource utilization instrumentation 250 may monitor the allocated resources to gather or otherwise collect utilization metrics relating to processing utilization, memory utilization, input/output bandwidth utilization (e.g., network bandwidth, disk bandwidth, etc.), storage utilization, or any other suitable utilization metric that relates to physical hardware and hypervisor resources 230 that the virtualization hosts 230 allocate to the workload 240. In one implementation, the resource utilization instrumentation 250 may include a packaged module that can be loaded with a kernel associated with the managed workload 240. For example, in response to a data center manager, orchestrator, or other resource manager deploying the workload 240 to a particular virtualization host 220, the kernel associated with the managed workload 240 may load the resource utilization instrumentation 250 into a guest operating system that can run the workload 240 over underlying physical hardware resources 230 that the particular virtualization host 220 allocates to host the workload 240.

In one implementation, the system 200 may further structure the managed workload 240 with the resource management policy engine 260 at a next level above the resource utilization instrumentation 250. The resource management policy engine 260 may receive the raw resource utilization metrics that the resource utilization instrumentation 250 collects from the underlying physical hardware and hypervisor resources 230. In one implementation, the resource management policy engine 260 may then process the raw resource utilization metrics received from the resource utilization instrumentation 250 to determine whether any action needs to be taken to tune or otherwise correct the physical hardware and hypervisor resources 230 allocated to the managed workload 240. For example, the resource management policy engine 260 may evaluate whether the workload 240 has any service level agreements or policies that define requirements associated with the resources allocated to the workload 240. Accordingly, in response to determining that the raw resource utilization metrics violate any defined service level agreements or other policies, the resource management policy engine 260 may initiate appropriate corrective action to remedy the violations. Alternatively, in response to determining that the raw resource utilization metrics comply with service level agreements or other policies associated with the workload 240, the resource management policy engine 260 may determine that the virtualization host 220 has allocated suitable physical resources 230 to the workload 240 and take no further action at that time.

In one implementation, the resource management policy engine 260 may enforce service level agreements or other policies depending on certain types or other characteristics associated with the workload 240. For example, where the workload 240 provides a function that requires high availability (e.g., a payroll processing system), the service level agreements or Other policies enforced with the resource management policy engine 260 may require that the processing utilization for the workload 240 remain a certain threshold below capacity to ensure that the workload 240 will continue to be available in the event that the processing utilization subsequently spikes. In another example, the resource management policy engine 260 may compute average utilization metrics over a period of time for some workloads 240 prior to taking any corrective action, while for other workloads 240, the resource management policy engine 260 may act on instantaneous utilization metrics, as appropriate. Moreover, in one implementation, the resource management policy engine 260 may customize any actions to be taken in response to the utilization metrics associated with various different resource classes violating the service level agreements or other policies (e.g., certain actions may be defined to remediate utilization violations associated with input/output bandwidth violations, while different actions may be defined to remediate utilization violations associated with storage capacity violations, etc.).

In one implementation, the system 200 may further structure the managed workload 240 with the virtualization host specific mapping 270 at a next level above the resource management policy engine 260. In particular, the hypervisor 230 that a particular virtualization host 220 allocates to the workload 240 may generally execute the guest operating system hosting the workload 240 over the underlying physical hardware resources 230, whereby the hypervisor 230 may permit various workloads 240 to share the underlying physical hardware resources 230 that the particular virtualization host 220 allocates to host the workload 240. As such, a management domain within the virtualization host 220 typically has responsibility to provision the physical hardware resources 230 allocated to the guest operating system that hosts the workload 240, whereby the managed workload 240 may execute the resource management policy engine 260 in a guest virtual machine structured to communicate with the virtualization host 220. In particular, the resource management policy engine 260 may be structured to communicate with the virtualization host 220 to request that the virtualization host 220 provision or tune the physical resources 230 allocated to the guest operating system hosting the workload 240.

In one implementation, the virtualization host specific mapping 270 may therefore isolate the resource management policy engine 260 from any differences between interfaces associated with the different management domains used across the various virtualization hosts 220. For example, as described in further detail in U.S. patent application Ser. No. 12/725,241, entitled "System and Method for Intelligent Workload Management." now issue as U.S. Pat. No. 8,745,205, which has been incorporated by reference above, any particular managed workload 240 may have various components hosted or otherwise deployed within various different virtualization hosts 220 (e.g., the workload 240 may have physical storage resources 230 allocated in one virtualization host 220 that has a large amount of available storage capacity, physical processing resources 230 allocated in another virtualization host 220 that has substantial processing capacity, etc.). In this context, one or more virtual machine configuration files that can launch the guest operating system hosting the workload 240 may specify certain limits or ranges for the physical resources 230 to be allocated to the guest operating system. In one implementation, the resource management policy engine 260 may then reference the virtual machine configuration files to manage the allocated physical resources 230 within the limits or ranges specified in the virtual machine configuration files (i.e., ensuring that the allocated physical resources 230 fail within the specified limits or ranges, initiating corrective action in response to the allocated physical resources 230 failing, to comply with the specified limits or ranges, etc.).

Accordingly, in response to the physical resources 230 allocated to the workload 240 failing to comply with the limits or ranges specified in the virtual machine configuration files, or alternatively that the allocated physical resources 230 have measured utilization metrics failing to comply with relevant service level agreements or other policies, the resource management policy engine 260 may reference the virtualization host specific mapping 270 to communicate with a particular virtualization host 220 that can provision or tune the physical resources 230 allocated to the workload 240. In one implementation, the resource management policy engine 260 may then communicate a resource provisioning request to an interface associated with the particular virtualization host 220, wherein the request may specify the resource limits, ranges, or utilization metrics that the workload 240 requires. The management domain associated with the virtualization host 220 may then receive the resource provisioning request from the resource management policy engine 260 and validate whether the virtualization host 220 has sufficient physical hardware resources 230 available to satisfy the resource limits, ranges, or utilization metrics that the workload 240 requires. In response to determining that the virtualization host 220 has available physical hardware resources 230 that can satisfy the request, the virtualization host 220 may then provision or otherwise tune the resources 230 allocated to the workload. Alternatively, in response to the virtualization host 220 not having available physical hardware resources 230 sufficient to satisfy the request, the resource management policy engine 260 (or the virtualization host 220) may communicate with a data center manager, orchestrator, or other suitable resource manager, which may redeploy one or more aspects or portions of the workload 240 to another virtualization host 220 that has sufficient available resources 230 to satisfy the request.

In one implementation, the resource utilization instrumentation 250, the resource management policy engine 260, and the virtualization host specific mapping 270 may therefore provide a structured software stack that can be packaged and injected into the managed workload 240. In particular, any suitable workload generating tool or utility may be modified to inject the structured software stack into the managed workload 240, whereby injecting the managed workload 240 with the structured software stack having the resource utilization instrumentation 250, the resource management policy engine 260, and the virtualization host specific mapping 270 packaged therein may support self-provisioning in the managed workload. For example, in one implementation, the system 200 may include a workload generating tool or utility that can be used to build virtual appliances with the structured software stack injected therein (e.g., as described in further detail in U.S. patent application Ser. No. 12/476,144, entitled "System and Method for Managing a Virtual Appliance Lifecycle," filed on Jun. 1, 2009 and now issue:

as U.S. Pat. No. 8,868,608, the contents of which are hereby incorporated by reference in their entirety).

Figure 3:
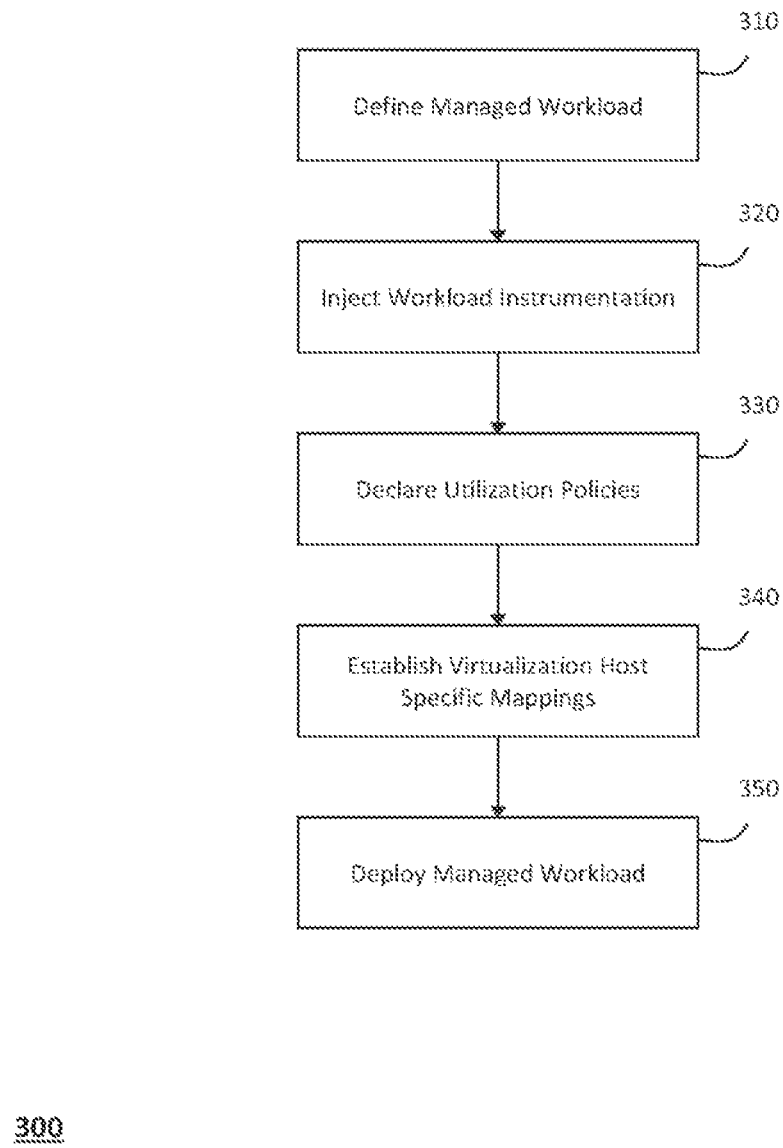
FIG. 3 illustrates an exemplary method for structuring self-provisioning workloads deployed in virtualized data centers, according to one aspect of the invention.

According to one aspect of the invention, FIG. 3 illustrates an exemplary method 300 for structuring self-provisioning workloads deployed in virtualized data centers. In particular, the method 300 illustrated in FIG. 3 may generally be, used to create a managed workload structured with a software stack having substantially components as described above in connection with FIG. 2 and then deploy the managed workload to one or more virtualization hosts. For example, in one implementation, the managed workload may be defined in an operation 310 using any suitable workload generating tool or utility that can infect the software stack into the managed workload. Thus, operation 310 may generally define various functions and characteristics associated with the workload (e.g., using techniques described in farther detail in U.S. patent application Ser. No. 12/725,241, entitled "System and Method for Intelligent Workload Management," now issued as U.S. Pat. No. 8,745,205, and U.S. patent application Ser. No. 12/476,144, entitled "System and Method for Managing a Virtual Appliance Lifecycle," and now issued as U.S. Pat. No. 8,868,608, which have incorporated by reference above). The managed workload defined in operation 310 may then be modified to include the structured software stack that can support the workload self-provisioning following deployment to the virtualization hosts, as will be described in further detail herein.

For example, in one implementation, an operation 320 may include injecting resource utilization instrumentation into the managed workload. In particular, the resource utilization instrumentation may provide intelligence and policies that can support self-provisioning within the managed workload at a lowest level, wherein the resource utilization instrumentation may be configured to collect or gather information relating to utilization metrics associated with resources that will be assigned or otherwise allocated to the managed workload. For example, the resource utilization instrumentation may monitor allocated resources to gather utilization metrics relating to processing, memory, input/output bandwidth (e.g., network bandwidth, disk bandwidth, etc.), storage, or other physical resources that may be allocated to the workload.

In one implementation, an operation 330 may then include declaring any resource utilization policies that apply to the managed workload, wherein the workload may structure a resource management policy engine that declares the resource utilization policies at a next level above the resource utilization instrumentation. The resource management policy engine may be configured or otherwise structured to receive raw resource utilization metrics that the resource utilization instrumentation may collect from the underlying physical resources that will be allocated to the workload, and may be further configured to process the raw resource utilization metrics to determine whether any action needs to be taken to tune or otherwise correct the allocation of the resources to the managed workload. For example, the resource management policy engine may declare any service level agreements or policies that define requirements associated with the resources to be allocated to the workload. Accordingly, in response to the raw resource utilization metrics collected with the resource utilization instrumentation violating any declared-service level agreements or other policies, the resource management policy engine may be configured to initiate any appropriate corrective action that have been defined to remedy the violations. Alternatively, in response to the raw resource utilization metrics complying with the service level agreements or other policies declared for the workload, the resource management policy engine may be configured to determine that the workload has suitable physical resources allocated thereto.

In one implementation, the resource management policy engine may be configured to enforce the service level agreements or other policies declared for the workload depending on certain types or other characteristics associated with the workload. For example, the policies declared in operation 330 may cause the resource management policy engine to compute average utilization metrics over period of times prior to taking any corrective action, or alternatively cause the resource management policy engine to act on instantaneous utilization metrics, as appropriate. Moreover, in one implementation, the policies declared in operation 330 may include customized actions that the resource management policy engine may take in response to utilization metrics associated with different resource classes violating the declared service level agreements or other policies.

In one implementation, an operation 340 may include establishing various virtualization host specific mappings, which the resource management policy engine may subsequently reference to control requests to provision or tune resources to be allocated to the managed workload. In particular, the workload defined in operation 310 may generally structure the virtualization host specific mapping at a next level above the resource management policy engine to manage a hypervisor that a particular virtualization host may allocate to the workload. For example, the hypervisor may generally execute a guest operating system hosting the workload over underlying physical hardware resources, whereby the hypervisor may permit various workloads to share the underlying physical hardware resources that the particular virtualization host allocates to host the workload. As such, a management domain within the virtualization host typically has responsibility to provision the physical hardware resources allocated to the guest operating system that hosts the workload, whereby the managed workload may execute the resource management policy engine in a guest virtual machine structured to communicate with the virtualization host. The resource management policy engine may therefore be structured to communicate with the virtualization host to request that the virtualization host provision or tune the physical resources allocated to the guest operating system hosting the workload, wherein the virtualization host specific mapping may isolate the resource management policy engine from any differences between interfaces associated with the different management domains used across the various virtualization hosts.

For example, a described in further detail in U.S. patent application Ser. No. 12/725,241, entitled "System and Method for Intelligent Workload Management," now issued as U.S. Pat. No. 8,745,205, which has been incorporated by reference above, any particular managed workload may have various components hosted or otherwise deployed within various different virtualization hosts (e.g., the workload may have physical storage resources allocated one virtualization host that has a large amount of available storage capacity, physical processing resources allocated in another virtualization host that has substantial processing capacity, etc.), In this context, one or more virtual machine configuration files that, can launch the guest operating system hosting the workload may specify certain limits or ranges for the physical resources to be allocated to the guest operating system, and the resource management policy engine may be configured to reference the virtualization host specific mapping and the virtual machine configuration files to manage the allocated physical resources within the specified limits or ranges in the virtual machine configuration files (i.e., ensuring that the allocated physical resources fall within the specified limits or ranges, initiating corrective action in response to the allocated physical resources failing to comply with the specified limits or ranges, etc.).

In one implementation, an operation 350 may then include deploying the managed workload structured with the resource utilization instrumentation, resource management policy engine, and the virtualization host specific mapping to one or more virtualization hosts. In particular, in response to a data center manager, orchestrator, or other resource manager deploying the workload to a particular virtualization host, a kernel associated with the managed workload may load the resource utilization instrumentation into a guest operating system that can run the workload over underlying physical resources that the particular virtualization host allocates to host the workload. The resource management policy engine may then reference the virtualization host specific mapping to communicate with the particular virtualization host to request provisioning the physical resources to the workload, wherein the request may specify the resource limits, ranges, or utilization metrics that the workload requires. The management domain associated with the virtualization host may then receive the resource provisioning request from the resource management policy engine and validate whether the virtualization host has sufficient physical hardware resources available to satisfy the resource limits, ranges, or utilization metrics that the workload requires. In response to determining that the virtualization host has available physical hardware resources that can satisfy the request, the virtualization host may then provision the resources to the workload. Alternatively, in response to the virtualization host not having available physical hardware resources sufficient to satisfy the request, the resource management policy engine (or the virtualization host) may communicate with the data center manager, orchestrator, or other suitable resource manager, which may redeploy one or more aspects or portions of the workload to another virtualization host that has sufficient available resources to satisfy the request.

Accordingly, the method 300 shown in FIG. 3 and described in further detail above may structure the managed workload to support self-provisioning following deployment to the virtualization hosts. In particular, the workload created with the techniques illustrated in FIG. 3 may have a scalable architecture that has injected intelligence and embedded policies that can be used to self-provision and self-tune physical resources allocated to the workload in cloud and virtualized data centers. As such, the scalable architecture may enhance portability for the managed workload across various cloud and virtualized data centers and control governance, risk, and compliance for the managed workload, among other things.

Figure 4:
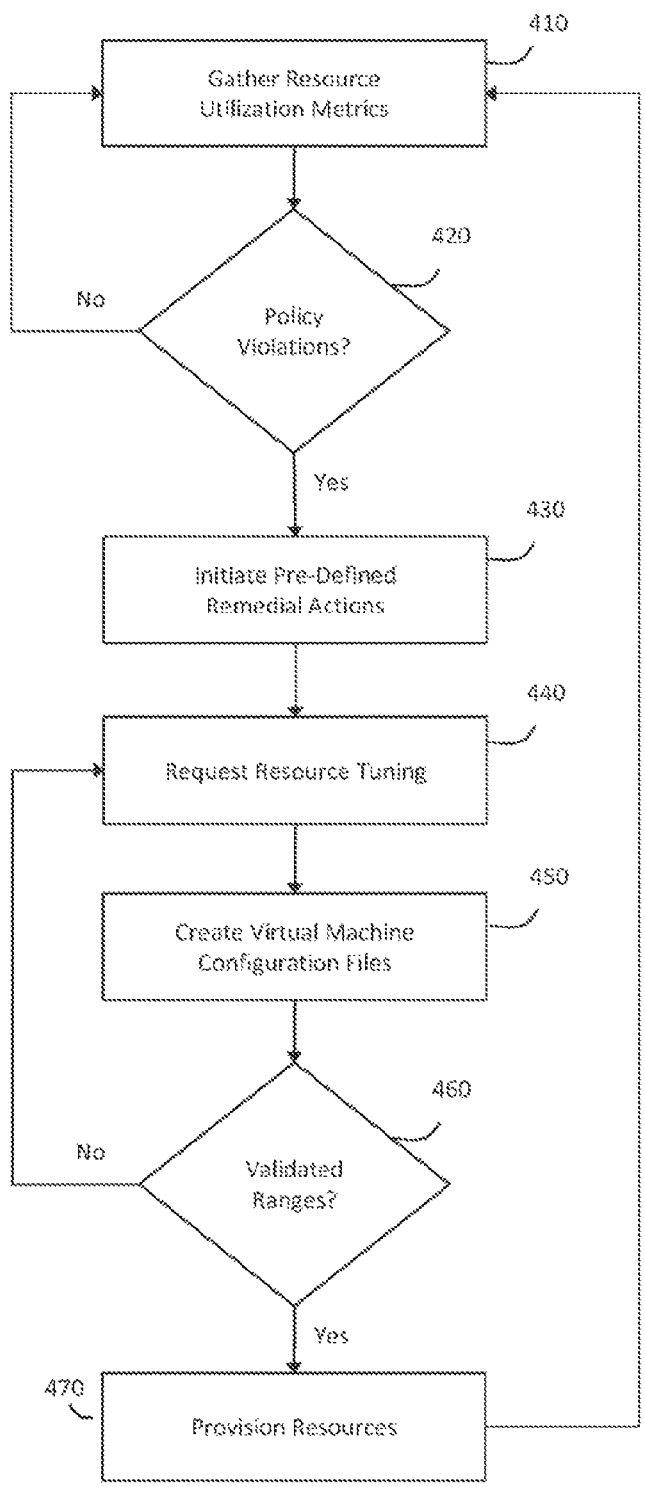
FIG. 4 illustrates an exemplary method for managing self-provisioning workloads, which may be structured and deployed in virtualized data centers with the techniques illustrated in FIG. 3, according to one aspect of the invention.

According to one aspect of the invention, FIG. 4 illustrates an exemplary method 400 for managing self-provisioning workloads, which may be structured and deployed in virtualized data centers with the techniques illustrated in FIG. 3 and described in further detail above. In particular, the method 400 illustrated in FIG. 4 may generally be performed in response to deploying a managed workload structured with a software stack that supports self-provisioning within the managed workload to one or more virtualization hosts (e.g., using the techniques shown in FIG. 3 and described in further detail above). For example, as noted above, structuring the managed workload with the software stack that supports self-provisioning may provide a scalable architecture that injects intelligence and embeds policies that the self-provisioning workload can generally use to request that the virtualization hosts provision or tune physical hardware resources allocated to the workload. As such, the scalable architecture may enhance portability for the managed workload across various cloud and virtualization hosts and control governance, risk, and compliance for the self-provisioning workload.

In one implementation, as noted above, the intelligence and policies that support self-provisioning within the managed workload may include resource utilization instrumentation, which may be structured in the managed workload at a lowest level. As such, in one implementation, an operation 410 may include the resource utilization instrumentation collecting or gathering information relating to utilization metrics associated with resources that the virtualization hosts (or management domains) have allocated to the managed workload. For example, operation 410 may generally include the resource utilization instrumentation monitoring the allocated resources to gather or otherwise collect the utilization metrics, which may relate to processing resources, memory resources, input/output bandwidth resources (e.g., network bandwidth, disk bandwidth, etc.), storage resources, or any other suitable resources that the virtualization hosts allocate to the managed workload. Furthermore, in one implementation, the resource utilization instrumentation that gathers the resource utilization metrics in operation 410 may include a packaged module that can be loaded with a kernel associated with the managed workload (e.g., in response to deploying the managed workload to a particular virtualization host, the kernel associated with the managed workload may load the resource utilization instrumentation into a guest operating system that runs the managed workload over the underlying physical hardware resources that the particular virtualization host allocates to the managed workload).

In one implementation, the managed workload may be further structured with a resource management policy engine at a level above the resource utilization instrumentation, wherein the resource management policy engine may receive the raw resource utilization metrics that the resource utilization instrumentation gathers from the underlying physical hardware resources in operation 410. In one implementation, an operation 420 may then include the resource management policy engine processing the raw resource utilization metrics to determine whether any action needs to be taken to tune or otherwise correct the physical resources allocated to the managed workload. For example, operation 420 may include the resource management policy engine evaluating whether the managed workload has any service level agreements or policies that define requirements associated with the resources allocated to the managed workload. Accordingly, in response to determining that the raw resource utilization metrics violate any defined service level agreements or other policies, the resource management policy engine may initiate appropriate corrective action to remedy the violations in an operation 430. Alternatively, in response to determining that the raw resource utilization metrics comply with the service level agreements or other policies associated with the managed workload, operation 420 may include the resource management policy engine determining that the virtualization host has allocated suitable physical resources to the managed workload, wherein the method 400 may return to operation 410 to continue gathering the resource utilization metrics without taking any further action at that time.

In one implementation, in response to the resource management policy engine determining that the raw resource utilization metrics violate any of the defined service level agreements or other policies, operation 430 may include the resource management policy engine enforcing the service level agreements or other policies depending on certain types or other characteristics associated with the managed workload. For example, where the managed workload provides a function that requires high availability, operation 430 may include the resource management policy engine enforcing the service level agreements or other policies to require that the processing utilization for the managed workload remain a certain threshold below capacity to ensure that the managed workload will continue to have high availability in the event that the processing utilization subsequently spikes. In another example, an operation 420 may include the resource management policy engine computing average utilization metrics over a period of prior to taking any corrective action in operation 430, or the resource management, policy engine may alternatively act on instantaneous utilization metrics in operations 420 and 430, as appropriate. Moreover, in one implementation, the resource management policy engine may customize the actions taken in operation 430 based on utilization metrics associated with various different resource classes (e.g., operation 430 may include initiating certain pre-defined actions to remediate utilization violations associated with input/output bandwidth violations, while different pre-defined actions may be initiated in operation 430 to remediate utilization violations associated with storage capacity violations).

In one implementation, the managed workload may be further structured with a virtualization host specific mapping at a level above the resource management policy engine. In particular, the hypervisor that a particular virtualization host allocates to the workload may generally execute a guest operating system hosting the managed workload over the underlying physical hardware resources, whereby the hypervisor may permit various workloads to share the underlying physical hardware resources that the virtualization host allocates to the managed workload. As such, a management domain within the virtualization host typically has responsibility to provision the physical hardware resources allocated to the guest operating system hosting the managed workload, whereby the managed workload may execute the resource management policy engine in a guest virtual machine structured to communicate with the virtualization host. In particular, the resource management policy engine may be structured to communicate with the virtualization host, whereby in response to operation 420 detecting one or more policy or service level agreement violations, an operation 440 may include the resource management policy engine requesting the virtualization host to provision or tune the physical resources allocated to host the managed workload.

In one implementation, the virtualization host specific mapping may therefore isolate the resource management policy engine from any differences between interfaces associated with the different management domains used across the various virtualization hosts. For example, as described in further detail in U.S. patent application Ser. No. 12/725,241, entitled "System and Method for Intelligent Workload Management," now issued as U.S. Pat. No. 8,745,205, which has been incorporated by reference above, any particular managed workload may have various components hosted or otherwise deployed within various different virtualization hosts (e.g., the managed workload may have physical storage resources allocated in one virtualization host that has substantial storage capacity available, while the managed workload may have physical processing resources allocated in another virtualization host that has substantial processing capacity). In this context, an operation 450 may include creating one or more virtual machine configuration files that can launch the guest operating system hosting the managed workload, wherein the virtual machine configuration files created in operation 450 may specify certain limits or ranges for the physical resources to allocate to the managed workload. In one implementation, operations 420 and 430 may therefore further include the resource management policy engine referencing the virtual machine configuration files to manage the allocated physical resources within the limits or ranges specified in the virtual machine configuration files (i.e., ensuring that the allocated physical resources fall within the specified limits or ranges in operation 420, initiating corrective, action in operation 430 in response to the allocated physical resources failing to comply with the specified limits or ranges, etc.).

Accordingly, in response to the physical resources allocated to the managed workload failing to comply with the limits or ranges specified in the virtual machine configuration files, or alternatively that the allocated physical resources have measured utilization metrics failing to comply with relevant service level agreements or other policies, operation 440 may include the resource management policy engine referencing the virtualization host specific mapping to communicate with a particular virtualization host that can provision or tune the physical resources allocated to the managed workload. In one implementation, the resource management policy engine may then communicate the resource provisioning request to an interface associated with the particular virtualization host, wherein the request may specify the resource limits, ranges, or utilization metrics that the workload requires. The management domain associated with the virtualization host may then receive the resource provisioning request from the resource management policy engine, and an operation 460 may include the management domain validating whether the associated virtualization host has sufficient available physical hardware resources to satisfy the resource limits, ranges, or utilization metrics that the managed workload requires. In response to determining that the virtualization host has available physical hardware resources that can satisfy the request in operation 460, the virtualization host may then provision or otherwise tune the resources allocated to the managed workload in an operation 470. Alternatively, in response to determining that the virtualization host does not have available physical hardware resources sufficient to satisfy the request in operation 460, the method 400 may return to operation 440, wherein the resource management policy engine (or the virtualization host) may communicate with a data center manager, orchestrator, or other suitable resource manager to request redeploying one or more aspects or portions of the managed workload to another virtualization host that has sufficient available resources to satisfy the request.

In one implementation, the structured software stack that supports self-provisioning within the managed workload may therefore include the resource utilization instrumentation, the resource management policy engine, and the virtualization host specific mapping, which any suitable workload generating tool or utility may package and inject into the managed workload. As such, injecting the structured software stack having the resource utilization instrumentation, the resource management policy engine, and the virtualization host specific mapping into the managed workload may support the managed workload self-provisioning following deployment to various cloud data centers, virtualized data centers, or other virtualization hosts that allocate physical hardware resources to the managed workload.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A set of executable instructions residing in a non-transitory computer-readable medium for execution on a processor, comprising:
    configuring, via the processor, a workload for delivery to a virtualization host having physical hardware resources, wherein the workload is an aggregation of services that are configured to work together and wherein the virtualization host is a virtual hosting environment partitioned from the physical hardware resources and the virtual hosting environment including multiple Virtual Machines (VMs), wherein the workload is configured to process within a guest operating system configured for and processing within the virtual hosting environment;
    provisioning, via the processor, the workload with a metric collection mechanism, a resource policy enforcement mechanism, and configuration files that define ranges for allocation of the physical hardware resources for processing the workload within the guest operating system of the virtualization host and configuring a policy engine for processing customized corrective actions identified in policies and processed when the allocation defined in the configuration files fail to comply with the ranges during usage of the physical hardware resources and when the workload processes based on bandwidth violations and storage capacity violations, the resource policy enforcement mechanism utilizing metrics from the metric collection mechanism to adjust real time allocations of the physical hardware resources based on the configuration files, and wherein the metrics are gathered by the metric collection mechanism and the metrics include information relevant to utilization of specific hardware resources used by the workload when the workload processes within the virtualization host;
    deploying, via the processor, the configured and provisioned workload to the virtualization host; and
    isolating, via the processor, differences between a policy engine interface for the policy engine in the virtualization host between other policy engine interfaces for other policy engines in other virtualization hosts in a virtualization host specific mapping for controlling and sharing the physical hardware resources between the virtualization host and the other virtualization hosts.

2. The medium of claim 1, wherein configuring further includes selecting the virtualization host for the workload based, at least in part, on the configuration files and the physical hardware resources of the virtualization host.

3. The medium of claim 2, wherein selecting further includes using attributes and parameters associated with the workload to assist in selecting the virtualization host.

4. The medium of claim 3, wherein using further includes acquiring a service level agreement defining memory, processor, and network constraints for the workload, wherein the service level agreement is one of the attributes.

5. The medium of claim 1, wherein provisioning further includes configuring the workload with the metric collection mechanism, the resource policy enforcement mechanism, and the configuration files for the workload to self-provision the physical hardware resources when deployed in the virtualization host.

6. The medium of claim 1, wherein provisioning further includes configuring the metric collection mechanism to monitor and report usage metrics of the workload when deployed in the virtualization host.

7. The medium of claim 1, wherein provisioning further includes configuring the metric collection mechanism as a packaged module loaded within a kernel of the guest operating system of the virtualization host.

8. The medium of claim 1, wherein provisioning further includes configuring the configuration files with a service level agreement for the physical hardware resources.

9. The medium of claim 1, wherein provisioning further includes configuring the resource policy enforcement mechanism to interact with the metric collection mechanism to gather real time usage metrics for the workload on the physical hardware resources and compare those usage metrics with information included in the configuration files.

10. The medium of claim 1, wherein provisioning further includes configuring the resource policy enforcement mechanism to dynamically tune usage and particular allocations of the physical hardware resources for the workload while the workload processes within the virtual host.

11. A set of executable instructions residing in a non-transitory computer-readable medium for execution on a processor, comprising:
    loading, via the processor, a workload as a virtual distribution on physical hardware resources, and wherein the workload is an aggregation of services that are configured to work together and to process within a virtualization host, and wherein the virtualization host is a virtual hosting environment partitioned from the physical hardware resources based on ranges of allocation for those physical hardware resources within a guest operating system configured for and processing within the virtualization host, and wherein the virtual distribution is a specific VM configured to process the workload within the virtualization host and the virtual distribution including customized corrective actions for processing defined in policies and processed when the allocation fails to comply with the ranges during usages of the physical hardware resources when the workload processes based on bandwidth violations and storage capacity violations;

initiating, via the processor, a packaged module within a kernel of an operating system for the specific VM;

self-tuning, via the processor, allocations of the physical hardware resources used by the workload as the workload processes within the specific VM based on constraints for the allocations managed by the packaged module and actions taken by the packaged module as the packaged module processes within the specific VM, and wherein the constraints relevant to utilization metrics of the physical hardware resources as the workload processes within the specific VM; and isolating, via the processor, differences between a policy engine interface for processing the customized corrective actions in the virtualization host between other policy engine interfaces for other customized corrective actions in other virtualization hosts in a virtualization host specific mapping for controlling and sharing the physical hardware resources between the virtualization host and the other virtualization hosts.

12. The medium of claim 11 further comprising, processing the method within a cloud environment.

13. The medium of claim 11, wherein self-tuning further includes obtaining usage metrics for processing the workload on the physical hardware resources.

14. The medium of claim 11, wherein self-tuning further includes obtaining the constraints as a service level agreement for the workload.

15. The medium of claim 11, wherein self-tuning further includes obtaining the constraints as configuration files for the workload.

16. The medium of claim 11, wherein self-tuning further includes obtaining the constraints as attributes or parameters associated with the workload.

17. The medium of claim 15, wherein self-tuning further includes tuning the physical hardware resources.

18. A system, comprising:

a memory having workload provision manager; and a processor coupled to the memory to execute the workload provision manager from the memory;

wherein the workload provision manager is configured to deploy a workload configured for ranges of allocation assigned to physical hardware resources within a guest operating system configured for and processing within a virtualization host and the workload further configured to dynamically self-adjust and self-provision itself for the physical hardware resources based on processing conditions of the physical hardware resources when the workload processes within the virtualization host and the workload configured with customized corrective actions defined in policies for processing when the allocation fails to comply with the ranges during usage of the physical hardware resources when the workload processes based on bandwidth violations and storage capacity violations, and wherein the workload is an aggregation of services that are configured to work together and to process within the virtualization host, and wherein the virtualization host is a virtual hosting environment partitioned from the physical hardware resources, and the workload provision manager is further configured to isolate differences between a policy engine interface for processing the customized corrective actions in the virtualization host between other policy engine interfaces for other customized corrective actions in other virtualization hosts in a virtualization host specific mapping for controlling and sharing the physical hardware resources between the virtualization host and the other virtualization hosts.

19. The system of claim 18, wherein the workload includes a packaged module that is configured to be loaded into the guest operating system of the physical hardware resources for performing the dynamic self-adjustment and self-provisioning.

20. The system of claim 19, wherein the packaged module includes a hardware metrics reporting mechanism, a policy enforcement mechanism, and hardware resource constraint information, each of which is configured to interact with, one another within the operating system of the virtualization host.

* * * * *